United States Patent
Comte et al.

(10) Patent No.: US 7,071,131 B2
(45) Date of Patent: Jul. 4, 2006

(54) CERAMMABLE MINERAL GLASS, GLASS-CERAMIC ARTICLES AND PREPARATION THEREOF

(75) Inventors: Marie Comte, Fontenay aux Roses (FR); Eric Papin, Barraux (FR)

(73) Assignee: Corning Incorporated, Corning, NY (US)

( * ) Notice: Subject to any disclaimer, the term of this patent is extended or adjusted under 35 U.S.C. 154(b) by 64 days.

(21) Appl. No.: 10/659,785

(22) Filed: Sep. 9, 2003

(65) Prior Publication Data

US 2004/0121895 A1  Jun. 24, 2004

Related U.S. Application Data

(60) Provisional application No. 60/448,900, filed on Feb. 19, 2003.

(51) Int. Cl.
  *C03C 3/085* (2006.01)
  *C03C 10/12* (2006.01)
  *C03C 10/04* (2006.01)

(52) U.S. Cl. .................. 501/4; 501/7; 501/69

(58) Field of Classification Search ............. 501/4, 501/7, 69
See application file for complete search history.

(56) References Cited

U.S. PATENT DOCUMENTS

| 3,926,602 A | 12/1975 | Andrus et al. |
| 4,018,612 A | 4/1977 | Chyung |
| 4,461,839 A | 7/1984 | Rittler |
| 5,070,045 A * | 12/1991 | Comte et al. ............. 501/4 |
| 6,528,440 B1 * | 3/2003 | Vilato et al. ............. 501/7 |
| 6,593,258 B1 * | 7/2003 | Shimatani et al. ........ 501/4 |
| 6,706,653 B1 * | 3/2004 | Comte .................... 501/4 |

FOREIGN PATENT DOCUMENTS

| DE | 199 39 787 A | 2/2001 |
| EP | 0 437 228 | 7/1991 |

* cited by examiner

*Primary Examiner*—Karl Group
(74) *Attorney, Agent, or Firm*—Siwen Chen

(57) ABSTRACT

The present invention relates to novel mineral glasses which are cerammable and which have a composition, expressed in percentages by weight of oxides, consisting essentially of: $SiO_2$ 65–70; $Al_2O_3$ 18–20.5; $Li_2O$ 2.5–3.8; MgO 0.55–1.5; ZnO 1.2–2.8; BaO 0–1.4; SrO 0–1.4; with BaO+SrO 0.4–1.4; with MgO+BaO+SrO 1.1–2.3; $Na_2O$ 0–<1; $K_2O$ 0–<1; with $Na_2O+K_2O$ 0–<1;

with $\dfrac{2.8Li_2O + 1.2ZnO}{5.2MgO} > 1.8$;

$TiO_2$ 1.8–3.5; $ZrO_2$ 0.8–2.5;

with $2.2 < \dfrac{TiO_2}{ZrO_2} < 4.5$; preferably $2.3 < \dfrac{TiO_2}{ZrO_2} < 4.5$;

and, optionally, an effective, non-excess amount of at least one fining agent. The present invention also relates to glass-ceramic articles made from such glass as well as processes for making such glass-ceramic articles.

11 Claims, No Drawings

CERAMMABLE MINERAL GLASS, GLASS-CERAMIC ARTICLES AND PREPARATION THEREOF

CROSS-REFERENCED APPLICATIONS

The present application claims priority of French Patent Application No. 02 11221, filed on Sep. 11, 2002.

The present application claims priority of U.S. provisional patent application Ser. No. 60/448,900, filed on Feb. 19, 2003, entitled "Cerammable Mineral Glass, Preparation of Glass-Ceramic Articles, Said Articles," the content of which is incorporated herein by reference in its entirety.

FIELD OF THE INVENTION

The present invention relates to:
novel mineral glasses which are cerammable;
use of said glasses or of mineral fillers, which are precursors of such glasses for preparing glass-ceramic articles. In this, said cerammable mineral glasses of the invention are particularly interesting. They enable quality glass-ceramics to be obtained under efficient process conditions;
the preparation of glass-ceramic articles, from such glasses or mineral fillers, which are precursors of such glasses;
said glass-ceramic articles.

BACKGROUND OF THE INVENTION

The present invention is related to U.S. Pat. No. 5,070,045, which is incorporated herein in its entirety. The present invention provides an improvement of the teaching of this reference.

The present invention is generally related to the art of preparation of glass-ceramic articles. It is well-known that this preparation has three main process steps:
melting a mineral glass or melting a mineral filler, which is a precursor of such a glass, containing an effective amount of nucleation agent(s). Mention can in general be made of a first step of melting vitrifiable starting materials containing said nucleation agent(s);
cooling and shaping the molten glass obtained, cooling to a temperature which is lower than the conversion domain (interval) of said glass;
crystallizing or ceramming the shaped glass by an appropriate heat treatment. In general, this third and last step of the process is carried out in two phases. The shaped glass (the glass article obtained after the second step of the process) is first of all brought to a temperature which is slightly higher than the conversion domain of said glass, so as to generate nucleation grains within it. The temperature is then increased up to a value which is high enough in order that the growth of the crystals on the grains be produced.

During the second of said steps (cooling and shaping of the melted glass), it is desired to prevent any devitrification, any crystallization, which is synonymous with appearance of faults in the glass prepared.

On the contrary, during the third of said steps (ceramming), it is desired to crystallize said glass in a controlled manner in order to convert it into a glass-ceramic.

The characteristics of devitrification of the glass, in particular its liquidus viscosity, are critical during the second of said steps. It is known that a risk is taken of generating defective products—glass having devitrification faults, within its mass and/or on the surface—insofar as the viscosity during shaping of the glass in question is higher than its liquidus viscosity. Each shaping process necessitates that the glass be conditioned in a given viscosity range. A glass having a higher liquidus viscosity enables an easier shaping. The tolerance with respect to the existence of cold points is greater. This is all the more true because the volume of glass concerned is greater.

In the case of the glass-ceramic, the objects formed (cooktop plates, fire protection windows . . . ) are in general of quite large dimensions, and, whatever the shaping technique implemented for the shaping of the precursor glasses is (lamination, pressing or shaping from gobs, as described in the patent application FR-A-2,735,562), an increase in the liquidus viscosity of said glasses is an appreciable advantage, in terms of lowering the percentage of losses (of defective products, due to the devitrification) and of flexibility of shaping.

The present invention provides, as indicated above, an improvement of the teaching of the patent U.S. Pat. No. 5,070,045 (a teaching according to which, from a single glass of the type specified, glass-ceramics can be obtained rapidly, the predominant crystalline phase of which is a solid solution of β-quartz or of β-spodumene, and the linear thermal expansion coefficient of which is very low, even zero), an improvement which aims to minimize the defective products mentioned above. Said improvement is based on the incorporation of novel mineral glasses (or novel mineral fillers), which possess a maximum liquidus viscosity. Within them, much less faults are generated during said second step (of conjugated cooling and shaping). In an entirely surprising way, the present invention offers a command of said second step, which is much greater than that which the prior art offered, without the third step, of ceramming, being disturbed by it.

Said novel glasses of the invention can be converted into glass-ceramics in a short time (less than two hours), in deforming very little, just as those described in the patent U.S. Pat. No. 5,070,045. They possess, with respect to said glasses of said US patent, a liquidus viscosity which is significantly increased.

The following can be specified with reference to the prior art.

For many years, with reference to the third step of ceramming, and only with reference to said third step, the importance is known of incorporating, in combination, the nucleation agents $TiO_2$ and $ZrO_2$. On this subject, reference can be made to the article by D. R. Stewart entitled "$TiO_2$ and $ZrO_2$ as nucleants in a lithia aluminosilicate glass-ceramic" (pages 83–90 of "Advances in Nucleation and Crystallization in Glasses. Edited by L. L. Hench and S. W. Freiman. American Ceramic Society, Columbus, Ohio, 1971"). Said article explains the interest in incorporating said nucleating agents, $TiO_2$ and $ZrO_2$, in a molar ratio, $$R' = \frac{TiO_2}{ZrO_2},$$

equal to 2. That is, for this value of said ratio, that the rate of conversion of the glass into glass-ceramic is the fastest and that the average size of the crystals is the lowest, i.e. that the best transparency of the glass-ceramic is obtained. These conclusions were recalled recently by G. H. Beall and L. R. Pinckney in an article entitled "Nanophase Glass-Ceramics", appearing in J. Am. Ceram. Soc., 82 [1], 5–16 (1999).

In the patent U.S. Pat. No. 5,070,045, the preparation, under advantageous conditions, notably in terms of rapidity, of glass-ceramic articles, is thus described. The cerammable glasses which are the starting materials, have the composition by weight below (%):

SiO$_2$ 65–70
Al$_2$O$_3$ 18–19.8
Li$_2$O 2.5–3.8
MgO 0.55–1.5
ZnO 1.2–2.8
BaO 0–1.4
SrO 0–1.4
with BaO+SrO 0.4–1.4
with MgO+BaO+SrO 1.1–2.3
As$_2$O$_3$ 0–1.5
Sb$_2$O$_3$ 0–1.5
with As$_2$O$_3$+Sb$_2$O$_3$ 0.5–1.5
Na$_2$O 0–<1
K$_2$O 0–<1
with Na$_2$O+K$_2$O 0–<1
with $$\frac{2.8\text{Li}_2\text{O} + 1.2\text{ZnO}}{5.2\text{MgO}} > 1.8$$

TiO$_2$ 1.8–3.2
ZrO$_2$ 1–2.5.

Said glasses have a liquidus viscosity which is greater than 700 Pa·s (certainly greater than or equal to 600 Pa·s) and can be thermally crystallized into a glass-ceramic having a predominant crystalline phase of which is a solid solution of β-quartz or β-spodumene, and a coefficient of linear thermal expansion (20°–700° C.) of 0±3×10$^{-7}$ K$^{-1}$.

Said glasses contain TiO$_2$ and ZrO$_2$, as nucleation agents, which are active in the third step of ceramming set forth above (specified in said US patent), in the amounts mentioned above. With reference to Tables 1 and 2 of said US patent, it is noted that the weight ratio $$R = \frac{\text{TiO}_2}{\text{ZrO}_2}$$

$$\left(\text{molar ratio } R' = \frac{\text{TiO}_2}{\text{ZrO}_2}\right),$$

is at the maximum 1.9 (2.97) (Example 4).

In this US patent, no teaching is provided anyway on any incidence of said weight ratio (molar ratio) in the implementation of the second step of cooling and shaping set forth above (also specified in said US patent).

In such a context, the inventors have established that, surprisingly, in having said weight ratio $$R = \frac{\text{TiO}_2}{\text{ZrO}_2}$$

between 2.2 and 4.5, the yield of said second step of cooling and shaping is considerably improved without affecting in a notable way the implementation of the third step of ceramming.

SUMMARY OF THE INVENTION

According one aspect, the present invention thus provides a mineral glasse having a composition by weight (expressed in percentages of oxides), consisting essentially of:

SiO$_2$ 65–70
Al$_2$O$_3$ 18–20.5
Li$_2$O 2.5–3.8
MgO 0.55–1.5
ZnO 1.2–2.8
BaO 0–1.4
SrO 0–1.4
with BaO+SrO 0.4–1.4
with MgO+BaO+SrO 1.1–2.3
Na$_2$O 0–<1
K$_2$O 0–<1
with Na$_2$O+K$_2$O 0–<1
with $$\frac{2.8\text{Li}_2\text{O} + 1.2\text{ZnO}}{5.2\text{MgO}} > 1.8$$

TiO$_2$ 1.8–3.5
ZrO$_2$ 0.8–2.5
with $$2.2 < \frac{\text{TiO}_2}{\text{ZrO}_2} < 4.5,$$

and, optionally, an effective, non-excess amount of at least one fining agent.

In a second aspect of the invention, it is provided a glass-ceramic article made of the mineral glass described supra. Depending on the ceramming schedule, the glass-ceramic material can be prepared to have, inter alia, β-quartz or β-spodumene as the predominant crystalline phase.

In a third aspect, accordingly, the present invention provides processes for making such glass-ceramic articles.

DETAILED DESCRIPTION OF THE INVENTION

Said mineral glasses of the invention are virtually glasses according to the patent U.S. Pat No. 5,070,045. Reference can be made, as already indicated, to the teaching of this US patent, in order notably to have precisions on the respective incorporation amounts of each one of the constituent elements (of said glasses) listed above.

With reference to the amount of incorporation of Al$_2$O$_3$, it is noted that within the glasses of the invention, it has proved to be possible, even advantageous, that it be greater than 19.8%. This value of 19.8% was the critical high value given in the patent U.S. Pat. No. 5,070,045. In incorporating more Al$_2$O$_3$ within the glasses of the invention, glass-ceramics have been obtained from said glasses, which have a better transparency.

Characteristically, in the composition by weight set forth above of the glasses of the invention, there is:

$TiO_2$ 1.8–3.5

$ZrO_2$ 0.8–2.5, with $$2.2 < R = \frac{TiO_2}{ZrO_2} < 4.5.$$

As already indicated, the inventors realized, with reference to the second step of obtaining a glass which is shaped in the preparation of a glass-ceramic, the importance of having said weight ratio $$R = \frac{TiO_2}{ZrO_2} > 2.2.$$

The glass obtained exhibits an interesting liquidus temperature, which is 50 to 100° C. lower than that of the glasses according to the patent U.S. Pat. No. 5,070,045. The viscosity of the novel glasses of the invention being comparable to that of the glasses according to said patent U.S. Pat. No. 5,070,045, the gain in the liquidus viscosity is significant.

Said weight ratio, $$R = \frac{TiO_2}{ZrO_2},$$

is kept at less than 4.5, since, over this, it is difficult to obtain glass-ceramics, the predominant crystalline phase of which is a solid solution of β-quartz, which are transparent. They become opalescent.

According to an advantageous variant, said weight ratio R is between 2.3 and 4.5.

The mineral glasses of the invention contain, advantageously, an effective, non-excess amount of at least one fining agent. The person skilled in the art knows perfectly well how to manage the incorporation of this type of compound within a mineral glass. In general, it is in fact incorporated at less than 2% by weight of this type of compound within the glasses of the invention.

As an illustration, and in a manner which is in no way limiting, an indication is made that the mineral glasses of the invention can also contain $As_2O_3$ and/or $Sb_2O_3$ as fining agents, as do the glasses according to the patent U.S. Pat No. 5,070,045, in the amounts indicated in said US patent, namely:

$As_2O_3$ 0–1.5

$Sb_2O_3$ 0–1.5 with $As_2O_3+Sb_2O_3$ 0.5–1.5 (% by weight).

Said mineral glasses of the invention can, in the same manner, contain other compounds such as $SnO_2$, $CeO_2$ and Cl, as fining agents.

The mineral glasses of the invention can be colored or non-colored.

In order that they display a real coloration, they contain, in addition to the constituent elements listed above, an effective amount of at least one coloring agent. Said coloring agent(s) is (are) in general selected from $CoO$, $Cr_2O_3$, $Fe_2O_3$, $MnO_2$, $NiO$, $V_2O_5$, $CeO_2$ (and their mixtures).

As colored mineral glasses of the invention, those are more particularly preferred which have the composition by weight indicated above with, in addition, from 0.03 (advantageously 0.05) to 1% by weight of $V_2O_5$ and the condition below:

$$3.8\% \leq TiO_2+ZrO_2+5V_2O_5 < 6\%.$$

Articles, notably transparent, black glass-ceramic articles, the main crystalline phase of which is β-quartz, can be obtained from such glasses of the invention.

It was observed that within such glasses of the invention, vanadium oxide has a coloring effect which is more marked than within the glasses according to the patent U.S. Pat. No. 5,070,045 and, that consequently, lower amounts prove a priori to be sufficient to obtain an equivalent coloration.

Without containing an effective amount of coloring agent(s), as specified above, glasses of the invention can have a slight coloration, due to the presence within them of a certain type of impurity(ies).

The glasses of the invention, which do not contain such an effective amount of coloring agent(s) (coloring agent(s) which is (are) added on purpose in their composition) advantageously have a content of alumina ($Al_2O_3$) of between 19.8 and 20.5% and a content of zirconium oxide ($ZrO_2$) of between 1.2 and 2.5%. With such glasses, very transparent glass-ceramics have been obtained, which are without opalescence.

Transparent, colorless or opalescent glass-ceramic articles, even opaque, colorless glass-ceramic articles, the main crystalline phases of which are β-quartz or β-spodumene, respectively, can be obtained from non-colored glasses of the invention.

In the same way, transparent, colored or opalescent glass-ceramic articles, even opaque, colored glass-ceramic articles, the main crystalline phase of which are β-quartz or β-spodumene, respectively, can be obtained from colored glasses of the invention.

In addition to the essential and optional constituents set forth above, the mineral glasses of the invention can contain other constituents. Obviously, they contain such other constituents only in a limited amount (generally of less than 2% by weight), only in an amount which does not jeopardize the characteristics of said glasses of the invention. It is thus for example in no way excluded that the glasses of the invention contain $P_2O_5$ and/or $B_2O_3$.

According to its second object, the present invention relates to the use of the mineral glasses above for the preparation of glass-ceramic articles. In an entirely logical way, said second object covers the use of fillers, which are precursors of such mineral glasses of the invention, for the preparation of glass-ceramic articles. In fact, according to the exact method of implementation of this preparation, the basic glass is isolated or not.

Said preparation of glass-ceramic articles, which constitutes the third object of the present invention, is implemented (almost) as described in the patent U.S. Pat. No. 5,070,045, with the original starting material described above (the composition of which, which is characterized mainly by $$R = \frac{TiO_2}{ZrO_2}$$

of between 2.2 and 4.5, is given above).

Thus, in order to prepare a glass-ceramic article containing a solid solution of β-quartz as predominant crystalline phase, the steps below are essentially carried out:

a) melting a glass as described above or melting a filler, a precursor of such a glass;

b) cooling the melted glass obtained to a temperature of lower than its conversion interval and simultaneously shaping it into the shape of the final article sought after;

c) increasing the temperature of the glass shape obtained, at the rate of 50 to 80° C./minute up to a temperature in the range 670–800° C.;

d) keeping said glass article within this temperature range between 670 and 800° C., for 15 to 25 minutes, in order to develop grains or nuclei within it;

e) increasing the temperature of said glass article, which is now nucleated, at a rate sufficient, in order to bring it, in 15–30 minutes, into the temperature interval of 900–980° C. (it proved to be possible, even advantageous, to increase said temperature up to 980° C.);

f) keeping said nucleated glass article in this temperature interval of 900–980° C., for 10 to 25 minutes, so as to make crystals of solid solution of β-quartz grow on these grains or nuclei;

g) rapidly cooling the crystallized article to ambient temperature.

Without incorporating an effective amount of at least one coloring agent in the composition of the initial glass (of the initial filler), and in the absence of colorant impurety(ies), the glass-ceramic article, obtained by the preparative process above, is colorless.

For the preparation of a glass-ceramic article containing a solid solution of β-spodumene as predominant crystalline phase, steps a) to g), clarified above, with a different temperature interval of 1,050–1,200° C. (instead of 900–980° C.) for the steps e) and f), are carried out in essentially the same manner.

The ceramming, carried out at a higher temperature, leads to the conversion of the transparent crystalline phase of solid solution of β-quartz (mainly) into another crystalline phase, derived from silica: a crystalline phase of solid solution of β-spodumene (mainly), which confers to the material an opalescent, white appearance, even an opaque appearance. The white color of said material, which is more or less opaque, can be sought after in specific domains of application.

For the preparation of a colored glass-ceramic article, containing a solution of β-quartz or of β-spodumene as predominant crystalline phase, the processes specified above are implemented, in incorporating, in step a), an effective amount of at least one coloring agent. It is recalled:

that the coloring agent(s) being incorporated is (are) generally selected from CoO, $Cr_2O_3$, $Fe_2O_3$, $MnO2$, NiO, $V_2O_5$, $Ce_2O$ (and the mixtures of these oxides);

that 0.03 to 1% (very advantageously 0.05 to 1%) by weight of $V_2O_5$ is advantageously incorporated with the condition below: $3.8\% \leq TiO_2 + ZrO_2 + 5V_2O_5 \leq 6\%$.

Steps b) to f) of the processes above, of obtaining a glass-ceramic article, are advantageously carried out in 2 hours at the maximum, and in about 1 hour in a particularly preferred manner.

According to its last object, the present invention relates to the glass-ceramic articles, which are obtainable according to the processes specified above, from mineral glasses (or mineral fillers, which are precursors of such glasses) which are constituents of the first object of said invention. The glass-ceramic of said articles has the composition indicated above for said mineral glasses. Such articles can notably consist of cooktop plates, which are adapted to different types of cooking (resistant, inductive, halogen heating), of cookware, which are also adapted to different types of cooking, to microwave oven bottom trays, woodstove windows, fire protection doors, fire protection windows. This list is obviously not limitative.

The invention is now illustrated by the Examples below. More specifically, Examples 1 to 4 and 4' illustrate said invention, and the importance of the invention emerges from the consideration of Examples A, B and C. Said Examples A and B illustrate the prior art ($R \leq 2$) whereas said Example C illustrates a specific case wherein $R > 4.5$ $$\left(R = \frac{TiO_2}{ZrO_2}; \text{weight ratio}\right).$$

weight ratio).

Examples A, B, C, 1 to 4

Table 1 below indicates, in its first part, the compositions by weight of the glasses in question and their liquidus characteristics; in its second part, the characteristics of glass-ceramics obtained from said glasses; said glass-ceramics containing a solution of β-quartz as predominant crystalline phase.

For each example, an indication is made, in said Table 1, of the weight ratios $$\left(R = \frac{TiO_2}{ZrO_2}\right)$$

and molar ratios $$\left(R' = \frac{TiO_2}{ZrO_2}\right).$$

It is noted that, for the glasses of the invention, there is an R' value which is significantly greater than 3, even though a ratio of 2 was recommended in the article by D. R. Stewart mentioned supra, and as regards the glasses exemplified in the patent U.S. Pat. No. 5,070,045, said ratio R' is of the order of 2.4.

The glasses are prepared in a usual manner from oxides and/or from compounds which are easily decomposable, such as nitrates or carbonates. The starting materials are mixed in order to obtain a homogeneous mixture. About 1,000 g, placed in a platinum crucible, are molten in an electric oven for 10 hours at 1,650° C. The melted glass is then poured onto a table and is rolled to a thickness of about 6 mm. It is then re-heated for 1 hour at 650° C., and then cerammed according to the following program:

rapid rise to 670° C.,
rise from 670 to 800° C. (nucleation interval) in 24 minutes,
rise, over 20 minutes, from 800 to 900° C.,
upkeep for 15 minutes between 900 and 980° C. (growth interval),
rapid cooling.

The liquidus temperatures were determined from small amounts of glass (a few grams), re-molten in platinum crucibles, and then held for 17 hours at the temperature studied before being tempered in air. The liquidus temperature is the lowest plateau temperature after which no crystals are observed.

The transmissions were measured on polished samples of 3 mm thickness. The measurement of visible transmission was made with the illuminant C, at a rate of a measurement point every nm, between 360 and 830 nm.

TABLE 1

|  | A | B | C | Example 1 | Example 2 | Example 3 | Example 4 |
|---|---|---|---|---|---|---|---|
| 1. Composition (% by weight) | | | | | | | |
| $SiO_2$ | 68.8 | 67.6 | 68.5 | 68.4 | 68.5 | 67.6 | 67.4 |
| $Al_2O_3$ | 18.95 | 19.85 | 18.95 | 18.95 | 18.95 | 19.75 | 20 |
| $Li_2O$ | 3.45 | 3.45 | 3.45 | 3.45 | 3.45 | 3.45 | 3.45 |
| MgO | 1.2 | 1.22 | 1.2 | 1.2 | 1.2 | 1.2 | 1.2 |
| ZnO | 1.62 | 1.66 | 1.62 | 1.62 | 1.62 | 1.62 | 1.62 |
| BaO | 0.8 | 0.8 | 0.8 | 0.8 | 0.8 | 0.8 | 0.8 |
| MgO + BaO + SrO | 2 | 2.02 | 2 | 2 | 2 | 2 | 2 |
| $As_2O_3$ | 0.5 | 0.79 | 0.8 | 0.8 | 0.8 | 0.8 | 0.8 |
| $Sb_2O_3$ | | | | | | | |
| $As_2O_3 + Sb_2O_3$ | 0.5 | 0.79 | 0.8 | 0.8 | 0.8 | 0.8 | 0.8 |
| $Na_2O$ | 0.15 | 0.17 | 0.15 | 0.15 | 0.15 | 0.15 | 0.17 |
| $K_2O$ | 0.2 | 0.19 | 0.2 | 0.2 | 0.2 | 0.2 | 0.19 |
| $Na_2O + K_2O$ | 0.35 | 0.36 | 0.35 | 0.35 | 0.35 | 0.35 | 0.36 |
| $(2.8Li_2O + 1.2ZnO)/5.2MgO$ | 1.86 | 1.84 | 1.86 | 1.86 | 1.86 | 1.86 | 1.86 |
| $TiO_2$ | 2.6 | 2.6 | 3.8 | 3.1 | 3.3 | 3.1 | 3.1 |
| $ZrO_2$ | 1.7 | 1.68 | 0.5 | 1.3 | 1 | 1.3 | 1.3 |
| $R = TiO_2/ZrO_2$ (weight ratio) | 1.53 | 1.55 | 7.6 | 2.38 | 3.3 | 2.38 | 2.38 |
| $R' = TiO_2/ZrO_2$ (molar ratio) | 2.4 | 2.4 | 11.7 | 3.6 | 5.1 | 3.7 | 3.7 |
| $V_2O_5$ | 0.22 | | 0.02 | 0.1 | 0.09 | 0.1 | |
| 2. Liquidus | 1,350° C. 6,000 P | 1,350° C. 6,000 P | > 30,000 P | 1,300° C. 10,000 P | 1,250° C. 30,000 P | 1,300° C. 10,000 P | 1,300° C. 10,000 P |
| 3. Appearance after ceramming | transparent black color | transparent practically colorless | Strongly opalescent black color | transparent black color | transparent black color | transparent black color | transparent practically colorless |
| 4. Properties after ceramming: | | | | | | | |
| CTE (25–700° C.) | $-1 \times 10^{-7} K^{-1}$ | $-1 \times 10^{-7} K^{-1}$ | | $-0.3 \times 10^{-7} K^{-1}$ | $0.2 \times 10^{-7} K^{-1}$ | $-0.1 \times 10^{-7} K^{-1}$ | |
| Visible transmission | 5.65 | | | 4 | 2.3 | 4.5 | |
| Transmission at 1,000 nm | 71.9 | | | 70.1 | 71.3 | 72.9 | |
| Transmission at 2,000 nm | 79.8 | | | 82.5 | 82.9 | 82.5 | |

Example 4'

Glass of Example 4 underwent the following treatment:
rapid rise to 670° C.,
rise from 670 to 800° C. (nucleation interval) in 20 minutes,
rise in 30 minutes to 1,070° C.,
upkeep for 30 minutes at 1,070° C.,
rapid cooling.

The resulting glass-ceramic contains β-spodumene as main phase. It has a white appearance, slightly translucent. Its dilation is of $8 \times 10^{-7} K^{-1}$ (20–700° C.).

The invention claimed is:

1. A mineral glass having a composition, expressed in percentages by weight of oxides, which essentially consists of:

SiO$_2$ 65–70
Al$_2$O$_3$ 18–20.5
Li$_2$O 2.5–3.8
MgO 0.55–1.5
ZnO 1.2–2.8
BaO 0–1.4
SrO 0–1.4
with BaO+SrO 0.4–1.4
with MgO+BaO+SrO 1.1–2.3
Na$_2$O 0–<1
K$_2$O 0–<1
with Na$_2$O+K$_2$O 0–<1
with $$\frac{2.8Li_2O + 1.2ZnO}{5.2MgO} > 1.8$$

TiO$_2$ 1.8–3.5
ZrO$_2$ 0.8–1.6
with $$2.2 < \frac{TiO_2}{ZrO_2} < 4.4;$$

and, optionally, an effective, non-excess amount of at least one fining agent.

2. The mineral glass according to claim 1, wherein $$2.3 < \frac{TiO_2}{ZrO_2} < 4.4.$$

3. The mineral glass according to claim 1, the composition of which further contains an effective amount of at least one coloring agent selected from CoO, $Cr_2O_3$, $Fe_2O_3$, $MnO_2$, NiO, $V_2O_5$ and $CeO_2$.

4. The mineral glass according to claim 1, the composition of which further contains 0.03 to 1% by weight of $V_2O_5$ with 3.8% ≦ $TiO_2+ZrO_2+5V_2O_5$ ≦ 6%.

5. The mineral glass according to claim 1 which does not further contain any coloring agent, wherein the $Al_2O_3$ content is between 19.8 and 20.5% and $ZrO_2$ content is between 1.2 and 1.6%.

6. A glass-ceramic article having a composition, expressed in percentages by weight of oxides, consisting essentially of:

SiO$_2$ 65–70

Al$_2$O$_3$ 18–20.5

Li$_2$O 2.5–3.8

MgO 0.55–1.5

ZnO 1.2–2.8

BaO 0–1.4

SrO 0–1.4 with BaO+SrO 0.4–1.4 with MgO+BaO+SrO 1.1–2.3

Na$_2$O 0–<1

K$_2$O 0–<1 with Na$_2$O+K$_2$O 0–<1 with $$\frac{2.8Li_2O + 1.2ZnO}{5.2MgO} > 1.8$$

TiO$_2$ 1.8–3.5

ZrO$_2$ 0.8–1.6 with $$2.2 < \frac{TiO_2}{ZrO_2} < 4.4;$$

and, optionally, an effective, non-excess amount of at least one fining agent.

7. The glass-ceramic article of according to claim 6, wherein $$2.3 < \frac{TiO_2}{ZrO_2} < 4.5.$$

8. The article according to claim 6 which is a cooktop plate, a cookware, a microwave oven bottom tray, a wood-stove window, a fire protection door, or a fire protection window.

9. The article according to claim 6, the composition of which further contains an effective amount of at least one coloring agent selected from CoO, $Cr_2O_3$, $Fe_2O_3$, $MnO_2$, NiO, $V_2O_5$ and $CeO_2$.

10. The article according to claim 6, the composition of which further contains 0.03 to 1% by weight of $V_2O_5$ with 3.8% ≦ $TiO_2+ZrO_2+5V_2O_5$ ≦ 6%.

11. The article according to claim 6 which does not further contain any coloring agent, wherein the $Al_2O_3$ content is between 19.8 and 20.5% and $ZrO_2$ content is between 1.2 and 1.6%.

* * * * *

UNITED STATES PATENT AND TRADEMARK OFFICE
CERTIFICATE OF CORRECTION

PATENT NO. : 7,071,131 B2 Page 1 of 1
APPLICATION NO. : 10/659785
DATED : July 4, 2006
INVENTOR(S) : Comte et al.

It is certified that error appears in the above-identified patent and that said Letters Patent is hereby corrected as shown below:

On the title page (73), replace the Assignee with --Eurokera, Chateau-Thierry, France (FR)--.

Signed and Sealed this

Seventh Day of November, 2006

JON W. DUDAS
*Director of the United States Patent and Trademark Office*